United States Patent
Terashima et al.

(10) Patent No.: US 8,591,034 B2
(45) Date of Patent: *Nov. 26, 2013

(54) PROJECTOR

(75) Inventors: Tetsuo Terashima, Azumino (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 13/186,996

(22) Filed: Jul. 20, 2011

(65) Prior Publication Data

US 2012/0026468 A1  Feb. 2, 2012

(30) Foreign Application Priority Data

Jul. 29, 2010  (JP) .................................. 2010-170535

(51) Int. Cl.
G03B 21/14  (2006.01)
(52) U.S. Cl.
USPC .................................................. 353/7; 353/85
(58) Field of Classification Search
USPC ................ 359/464, 462, 475; 348/51, 55, 56; 349/15; 315/209 R, 216, 219, 224, 246, 315/291, 307, 308
See application file for complete search history.

(56) References Cited

U.S. PATENT DOCUMENTS

| 2007/0076175 A1 | 4/2007 | Nakagawa et al. |
| 2010/0253920 A1 | 10/2010 | Miyazawa |
| 2011/0310348 A1* | 12/2011 | MacNaughton et al. ......... 353/8 |
| 2012/0044466 A1* | 2/2012 | Sato et al. ......................... 353/85 |
| 2012/0154752 A1* | 6/2012 | Terashima et al. ................ 353/7 |
| 2013/0088693 A1* | 4/2013 | Terashima et al. ................ 353/85 |

FOREIGN PATENT DOCUMENTS

| JP | A-2003-102030 | 4/2003 |
| JP | A-2008-103091 | 5/2008 |
| JP | A-2009-237302 | 10/2009 |

OTHER PUBLICATIONS

Sep. 29, 2011 Extended Search Report issued in European Patent Application No. 11175414.9.
European Search Report issued in Application No. 12192501.0 dated Feb. 13, 2013.

* cited by examiner

Primary Examiner — William C Dowling
(74) Attorney, Agent, or Firm — Oliff & Berridge, PLC

(57) ABSTRACT

A projector adapted to switch between a right-eye image and a left-eye image at predetermined timings to output the right-eye image and the left-eye image alternately, includes: a discharge lamp; a discharge lamp drive section adapted to supply the discharge lamp with a drive current for driving the discharge lamp; and a control section adapted to control the discharge lamp drive section, wherein a period between the switching timings temporally adjacent to each other starts with a first period and ends with a second period, and the control section performs a second period alternating-current control process for controlling the discharge lamp drive section so that an absolute value of the drive current becomes relatively small in the first period, and becomes relatively large in the second period, and an alternating current is supplied to the discharge lamp as the drive current in the second period.

13 Claims, 9 Drawing Sheets

FIRST POLARITY STATE P1
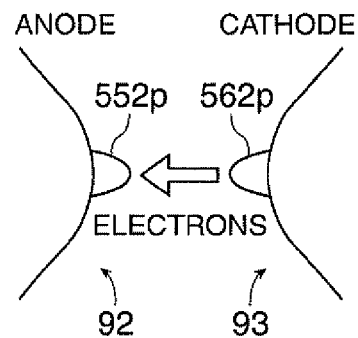
FIG. 6A
SECOND POLARITY STATE P2
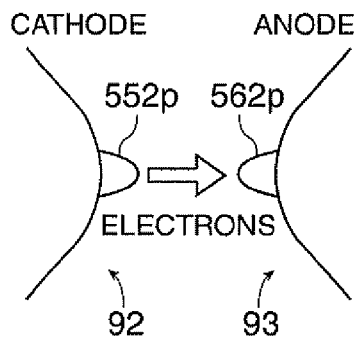
FIG. 6B
FIG. 6C
FIG. 6D
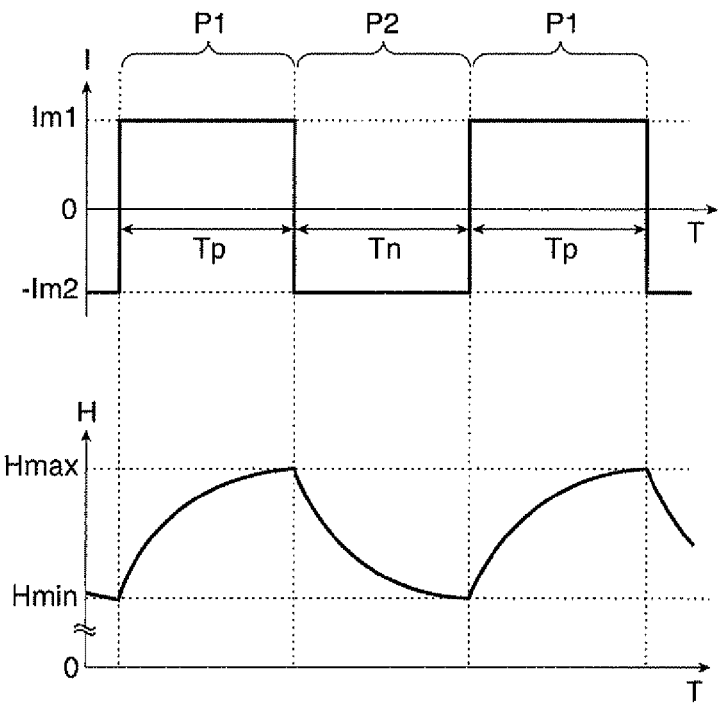

PROJECTOR

This application claims priority to Japanese Patent Application No. 2010-170535, filed Jul. 29, 2010, which is hereby incorporated by reference in its entirety.

BACKGROUND

1. Technical Field

The present invention relates to a projector.

2. Related Art

Projectors using a discharge lamp such as a high-pressure mercury lamp or a metal halide lamp are put into practical use. As such a projector, there is disclosed a projector having a device for varying the intensity of the light source in sync with a video signal in accordance with a color separation section or the like in, for example, JP-A-2003-102030. However, JP-A-2009-237302 describes the problem that the consumption of the electrode of the discharge lamp becomes marked if the intensity of the light source is varied simply.

Further, in recent years, projectors using a discharge lamp such as a high-pressure mercury lamp or a metal halide lamp to output a stereoscopic image are put into practical use.

As one of the methods of outputting a stereoscopic image, there can be cited a method of switching between a right-eye image and a left-eye image to output them alternately (an active shutter glasses method such as "XpanD beyond cinema (a trademark of X6D Limited)"). In this method, a pair of active shutter glasses synchronized with the video signal is used for showing the right-eye image to the right eye and the left-eye image to the left eye to thereby make the image stereoscopic using the parallax between the right and left eyes.

In the case of projecting the stereoscopic image using the method of alternately outputting the right-eye image and the left-eye image, the amount of the light input to each of the right and left eyes becomes a half as much as in the case of projecting a conventional planar image (a two-dimensional image). Further, since the image does not seem stereoscopic if the cross talk in which the right-eye image enters the left eye and the left-eye image enters the right eye occurs, it becomes necessary to provide the period in which the both active shutters are closed. Therefore, there arises a problem that in the case of projecting the stereoscopic image using the method of alternately outputting the right-eye image and the left-eye image, the image seems darker than in the case of projecting the conventional planar image. Although it is also possible to simply raise the drive power in order for making the image seem brighter, there arises a problem that the power consumption of the projector is increased, and the deterioration of the peripheral components is promoted due to the raise in the drive power.

SUMMARY

An advantage of some aspects of the invention is to provide a projector capable of projecting a stereoscopic image so as to seem brighter while preventing the consumption of the electrode of the discharge lamp.

An aspect of the invention is directed to a projector adapted to switch between a right-eye image and a left-eye image at predetermined timings to output the right-eye image and the left-eye image alternately, including a discharge lamp, a discharge lamp drive section adapted to supply the discharge lamp with a drive current for driving the discharge lamp, and a control section adapted to control the discharge lamp drive section, wherein a period between the switching timings temporally adjacent to each other starts with a first period and ends with a second period, and the control section performs a second period alternating-current control process for controlling the discharge lamp drive section so that an absolute value of the drive current becomes relatively small in the first period, and becomes relatively large in the second period, and an alternating current is supplied to the discharge lamp as the drive current in the second period.

According to this aspect of the invention, since the control section controls the discharge lamp drive section so that the absolute value of the drive current becomes relatively small in the first period, and becomes relatively large in the second period, the projector capable of projecting the stereoscopic image so as to seem bright can be realized.

Further, according to this aspect of the invention, since the control section performs the second period alternating-current control process for controlling the discharge lamp drive section to supply the discharge lamp with an alternating current as the drive current in the second period, the consumption of the electrodes of the discharge lamp can be prevented.

The projector of the aspect of the invention may be configured such that the control section performs a first period direct-current control process for controlling the discharge lamp drive section to supply the discharge lamp with a direct current as the drive current in the first period, and in the first period direct-current control process, the control section controls the discharge lamp drive section to supply the discharge lamp with the direct current having a polarity reversed between the two first periods temporally disposed on both sides of the second period as the drive current.

According to this configuration, the thermal load balance between the electrodes of the discharge lamp can be maintained. Therefore, the electrodes of the discharge lamp can be prevented from being consumed in an imbalanced manner.

The projector of the aspect of the invention may be configured such that the control section performs a first period alternating-current control process for controlling the discharge lamp drive section to supply the discharge lamp with an alternating current as the drive current in the first period.

According to this configuration, the flicker can be prevented from occurring in the first period in which the electrode temperature of the discharge lamp is lowered. Further, the prevention of the flicker from occurring also leads to stabilization of the position of the discharge point. Therefore, it is possible to prevent the deformation of the projection in the case in which the electrode temperature becomes relatively low.

The projector of the aspect of the invention may be configured such that in the first period alternating-current control process, the control section controls the discharge lamp drive section to supply the discharge lamp with an alternating current with a frequency higher than in the second period alternating-current control process.

According to this configuration, the flicker can further be prevented from occurring in the first period in which the electrode temperature of the discharge lamp is lowered. Further, the prevention of the flicker from occurring also leads to stabilization of the position of the discharge point. Therefore, it is possible to prevent the deformation of the projection in the case in which the electrode temperature becomes relatively low.

The projector of the aspect of the invention may be configured such that the control section performs a first period alternating-current control process for controlling the discharge lamp drive section to supply the discharge lamp with an alternating current having a phase reversed between the two first periods temporally disposed on both sides of the second period as the drive current.

According to this configuration, the thermal balance between the electrodes of the discharge lamp can be achieved. Therefore, the electrodes of the discharge lamp can be prevented from being consumed in an imbalanced manner.

The projector of the aspect of the invention may be configured such that the control section performs the second period alternating-current control process for controlling the discharge lamp drive section to supply the discharge lamp with an alternating current having a phase reversed between the two second periods temporally disposed on both sides of the first period as the drive current.

According to this configuration, the thermal balance between the electrodes of the discharge lamp can be achieved. Therefore, the electrodes of the discharge lamp can be prevented from being consumed in an imbalanced manner.

The projector of the aspect of the invention may be configured such that a main reflecting mirror disposed on a first electrode side of the discharge lamp, and adapted to reflect a light beam generated by the discharge lamp to thereby emit the light beam to an illuminated area, and a sub-reflecting mirror disposed on a second electrode side so as to face the main reflecting mirror of the discharge lamp, and adapted to reflect the light beam generated by the discharge lamp toward the main reflecting mirror are further provided, and the control section controls the discharge lamp drive section to supply the discharge lamp with an alternating current starting with a phase in which the second electrode acts as an anode as the drive current in at least one of the first period alternating-current control process and the second period alternating-current control process.

According to this configuration, it is possible to prevent the deformation of the second electrode, which is more easily deformed than the first electrode, to thereby stabilize the distance between the electrodes of the discharge lamp.

BRIEF DESCRIPTION OF THE DRAWINGS

The invention will be described with reference to the accompanying drawings, wherein like numbers reference like elements.

FIGS. 6A through 6D are explanatory diagrams showing a relationship between the polarity of drive current supplied to a discharge lamp and the temperature of the electrodes.

DESCRIPTION OF EXEMPLARY EMBODIMENTS

Hereinafter, preferred embodiments of the invention will be described in detail with reference to the accompanying drawings. It should be noted that the embodiments described below do not unreasonably limit the contents of the invention as set forth in the appended claims. Further, all of the constituents described below are not necessarily essential elements of the invention.

1. Projector According to First Embodiment 1-1. Optical System of Projector

Figure 1:
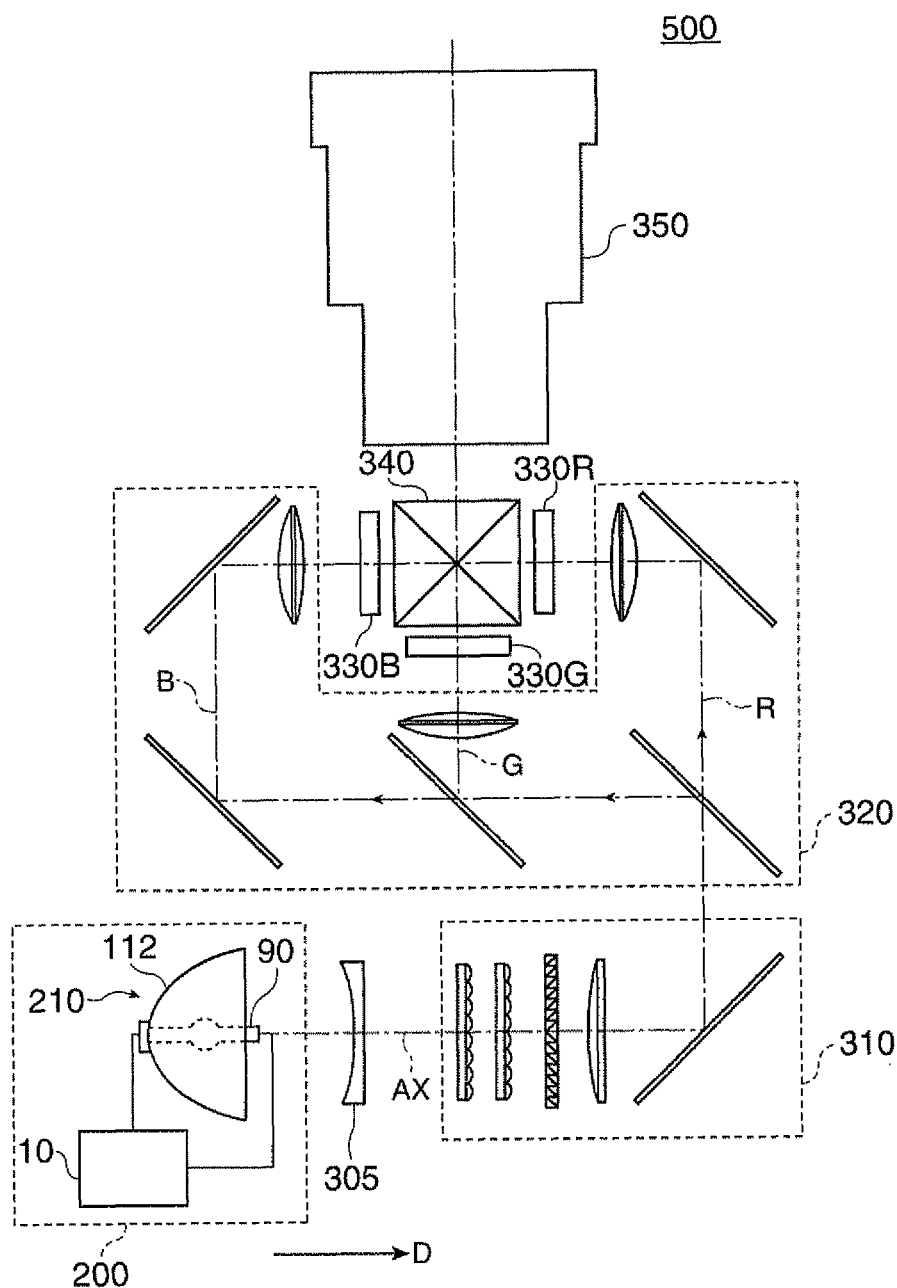
FIG. 1 is an explanatory diagram showing an optical system of a projector according to a first embodiment of the invention.

FIG. 1 is an explanatory diagram showing an optical system of a projector 500 according to a first embodiment of the invention. The projector 500 includes a light source device 200, a collimating lens 305, an illumination optical system 310, a color separation optical system 320, three liquid crystal light valves 330R, 330G, and 330B, a cross dichroic prism 340, and a projection optical system 350.

The light source device 200 is provided with a light source unit 210 and a discharge lamp lighting device 10. The light source unit 210 includes a main reflecting mirror 112, a sub-reflecting mirror 50 (described later), and a discharge lamp 90. The discharge lamp lighting device 10 supplies the discharge lamp 90 with electrical power to thereby light the discharge lamp 90. The main reflecting mirror 112 reflects the light, which is emitted from the discharge lamp 90, toward an irradiation direction D. The irradiation direction D is parallel to the optical axis AX. The light from the light source unit 210 passes through the collimating lens 305 and enters the illumination optical system 310. The collimating lens 305 collimates the light from the light source unit 210.

The illumination optical system 310 equalizes the illuminance of the light from the light source device 200 in the liquid crystal light valves 330R, 330G, and 330B. Further, the illumination optical system 310 uniforms the polarization direction of the light from the light source device 200 to one direction. The reason therefor is to effectively utilize the light from the light source device 200 in the liquid crystal light valves 330R, 330G, and 330B. The light adjusted in the illuminance distribution and the polarization direction enters the color separation optical system 320. The color separation optical system 320 separates the incident light into three colored lights of red (R), green (G), and blue (B). The liquid crystal light valves 330R, 330G, and 330B provided with correspondence with the respective colors modulate the three colored lights, respectively. The liquid crystal light valves 330R, 330G, and 330B are respectively provided with liquid crystal panels 560R, 560G, and 560B (described later) and polarization plates (not shown) disposed on both of the light entrance side and the light exit side of the respective liquid crystal panels 560R, 560G, and 560B. The cross dichroic prism 340 combines the three colored lights thus modulated. The combined light enters the projection optical system 350. The projection optical system 350 projects the incident light on a screen not shown. Thus, an image is displayed on the screen.

It should be noted that as a configuration of each of the collimating lens 305, the illumination optical system 310, the color separation optical system 320, the cross dichroic prism 340, and the projection optical system 350, various configurations well known to the public can be adopted.

Figure 2:
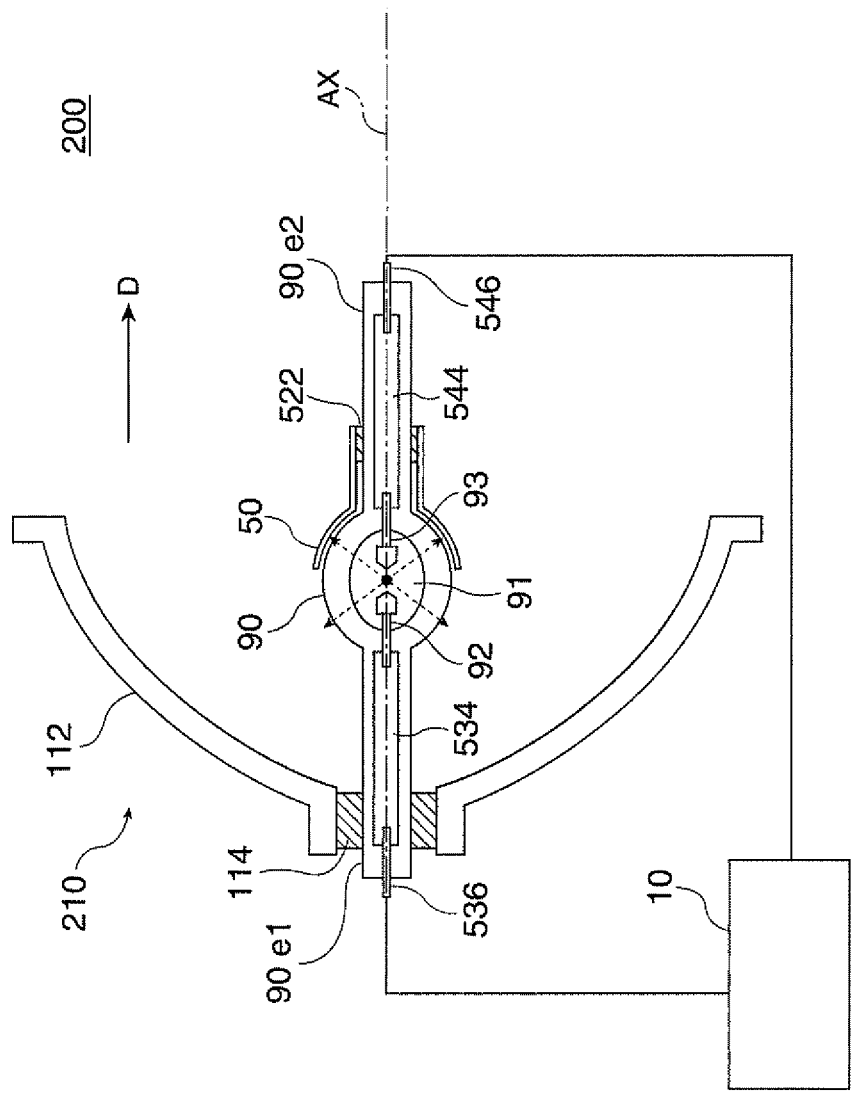
FIG. 2 is an explanatory diagram showing a configuration of a light source device.

FIG. 2 is an explanatory diagram showing a configuration of the light source device 200. The light source device 200 is provided with the light source unit 210 and the discharge lamp lighting device 10. In the drawing a cross-sectional view of the light source unit 210 is shown. The light source unit 210 includes the main reflecting mirror 112, the discharge lamp 90, and the sub-reflecting mirror 50.

The shape of the discharge lamp 90 is a rod-like shape extending from a first end 90e1 to a second end 90e2 along the irradiation direction D. A material of the discharge lamp 90 is a light transmissive material such as quartz glass. A center portion of the discharge lamp 90 bulges like a sphere, and a discharge space 91 is formed therein. Inside the discharge space 91, there is encapsulated a gas as a discharge medium including a noble gas, a metallic halide, and so on.

Further, inside the discharge space 91, a first electrode 92 and a second electrode 93 protrude from the discharge lamp 90. The first electrode 92 is disposed on the first end 90e1 side of the discharge space 91, and the second electrode 93 is disposed on the second end 90e2 side of the discharge space 91. Each of the first electrode 92 and the second electrode 93 has a rod-like shape extending along the optical axis AX. Inside the discharge space 91, electrode tips (also referred to as "discharge ends") of the first electrode 92 and the second electrode 93 are opposed to each other with a predetermined distance. It should be noted that the material of the first electrode 92 and the second electrode 93 is metal such as tungsten.

The first end 90e1 of the discharge lamp 90 is provided with a first terminal 536. The first terminal 536 and the first electrode 92 are electrically connected to each other with a conductive member 534 disposed through the inside of the discharge lamp 90. Similarly, the second end 90e2 of the discharge lamp 90 is provided with a second terminal 546. The second terminal 546 and the second electrode 93 are electrically connected to each other with a conductive member 544 disposed through the inside of the discharge lamp 90. The material of the first terminal 536 and the second terminal 546 is metal such as tungsten. Further, as each of the conductive members 534, 544, molybdenum foil is used, for example.

The first terminal 536 and the second terminal 546 are connected to the discharge lamp lighting device 10. The discharge lamp lighting device 10 supplies the first terminal 536 and the second terminal 546 with the drive current for driving the discharge lamp 90. As a result, arc discharge is caused between the first electrode 92 and the second electrode 93. The light (discharge light) generated by the arc discharge is emitted from the discharge position in all directions as illustrated with the dashed arrows.

To the first end 90e1 of the discharge lamp 90, there is attached the main reflecting mirror 112 with a fixing member 114. A reflecting surface (a surface facing the discharge lamp 90) of the main reflecting mirror 112 has a spheroidal shape. The main reflecting mirror 112 reflects the discharge light toward the irradiation direction D. It should be noted that as the shape of the reflecting surface of the main reflecting mirror 112, various shapes for reflecting the discharge light toward the irradiation direction D can be adopted besides the spheroidal shape. A paraboloid of revolution, for example, can also be adopted. In this case, the main reflecting mirror 112 can convert the discharge light into the light roughly parallel to the optical axis AX. Therefore, the collimating lens 305 can be eliminated.

On the second end 90e2 side of the discharge lamp 90, there is fixed the sub-reflecting mirror 50 with a fixing member 522. A reflecting surface (a surface facing the discharge lamp 90) of the sub-reflecting mirror 50 has a spherical shape surrounding the second end 90e2 side of the discharge space 91. The sub-reflecting mirror 50 reflects the discharge light toward the main reflecting mirror 112. Thus, the utilization efficiency of the light emitted from the discharge space 91 can be improved.

It should be noted that as a material of the fixing members 114, 522, there can be adopted an arbitrary heat-resistant material (e.g., an inorganic adhesive) resistant to the heat generated by the discharge lamp 90. Further, as the method of fixing the arrangement of the main reflecting mirror 112 and the sub-reflecting mirror 50 with respect to the discharge lamp 90, an arbitrary method can be adopted besides the method of fixing the main reflecting mirror 112 and the sub-reflecting mirror 50 to the discharge lamp 90. For example, it is also possible to fix the discharge lamp 90 and the main reflecting mirror 112 independently to a housing (not shown) of the projector. The same can be applied to the sub-reflecting mirror 50.

1-2. Circuit Configuration of Projector

Figure 3:
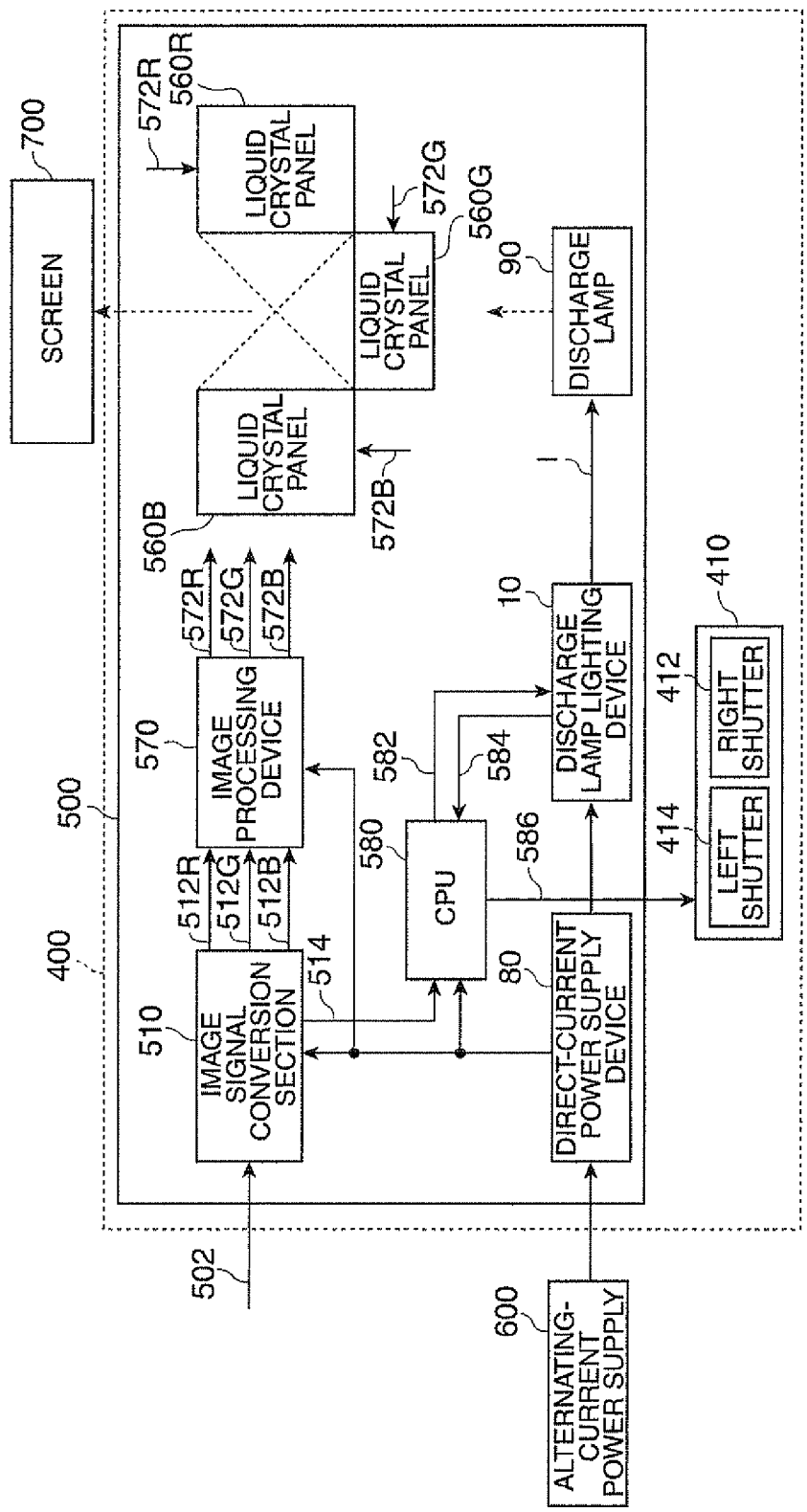
FIG. 3 is a diagram showing an example of a circuit configuration of the projector according to the first embodiment.

FIG. 3 is a diagram showing an example of a circuit configuration of a projector according to the first embodiment. The projector 500 can include an image signal conversion section 510, a direct current power supply device 80, the discharge lamp lighting device 10, the discharge lamp 90, liquid crystal panels 560R, 560G, and 560B, an image processing device 570, and a central processing unit (CPU) 580 besides the optical system explained above. Further, it is also possible to configure the first embodiment as a projector system 400 including the projector 500 and the active shutter glasses 410.

The image signal conversion section 510 converts an image signal 502 (a luminance/color-difference signal, an analog RGB signal, and so on) input from the outside into a digital RGB signal of a predetermined word length to thereby generate image signals 512R, 512G, and 512B, and then supplies the image processing device 570 with the image signals. Further, when a stereoscopic image signal switched alternately between the right-eye image and the left-eye image at a predetermined switching timing is input as the image signal 502, the image signal conversion section 510 supplies the CPU 580 with a sync signal 514 based on the switching timing between the right-eye image and the left-eye image.

The image processing device 570 performs image processing on each of the three image signals 512R, 512G, and 512B, and supplies the liquid crystal panels 560R, 560G, and 560B with drive signals 572R, 572G, and 572B for driving the liquid crystal panels 560R, 560G, and 560B, respectively.

The direct-current power supply device 80 converts the alternating-current voltage supplied from an external alternating-current power supply 600 into a constant direct-current voltage, and supplies the direct-current voltage to the image signal conversion section 510 and the image processing device 570 both disposed on the secondary side of a transformer (not shown, but included in the direct-current power supply device 80), and the discharge lamp lighting device 10 disposed on the primary side of the transformer.

The discharge lamp lighting device 10 generates a high voltage between the electrodes of the discharge lamp 90 at the time of startup to thereby cause dielectric breakdown for forming the discharge path, and then supplies a drive current "I" for the discharge lamp 90 to maintain the discharge.

The liquid crystal panels 560R, 560G, and 560B each modulate the luminance of the colored light entering the liquid crystal panel via the optical system explained above based on the drive signals 572R, 572G, and 572B, respectively.

The CPU 580 controls the operation of the projector from the beginning of lighting to the end of lighting. For example, it is also possible to output a lighting command and an extinction command to the discharge lamp lighting device 10 via a communication signal 582. Further, it is also possible for the CPU 580 to receive lighting information of the discharge lamp 90 from the discharge lamp lighting device 10 via the communication signal 584. Further, it is also possible for the CPU 580 to output a control signal 586 for controlling the active shutter glasses 410 in sync with the image signal 502 via a wired or wireless communication section based on the sync signal 514.

The active shutter glasses 410 can include a right shutter 412 and a left shutter 414. The right shutter 412 and the left shutter 414 are controlled based on the control signal 586. When the user wears the active shutter glasses 410, the visual field of the right eye can be blocked by closing the right shutter 412. Further, when the user wears the active shutter glasses 410, the visual field of the left eye can be blocked by closing the left shutter 414. The right shutter 412 and the left shutter 414 can each be composed of, for example, a liquid crystal shutter.

1-3. Configuration of Discharge Lamp Lighting Device

Figure 4:
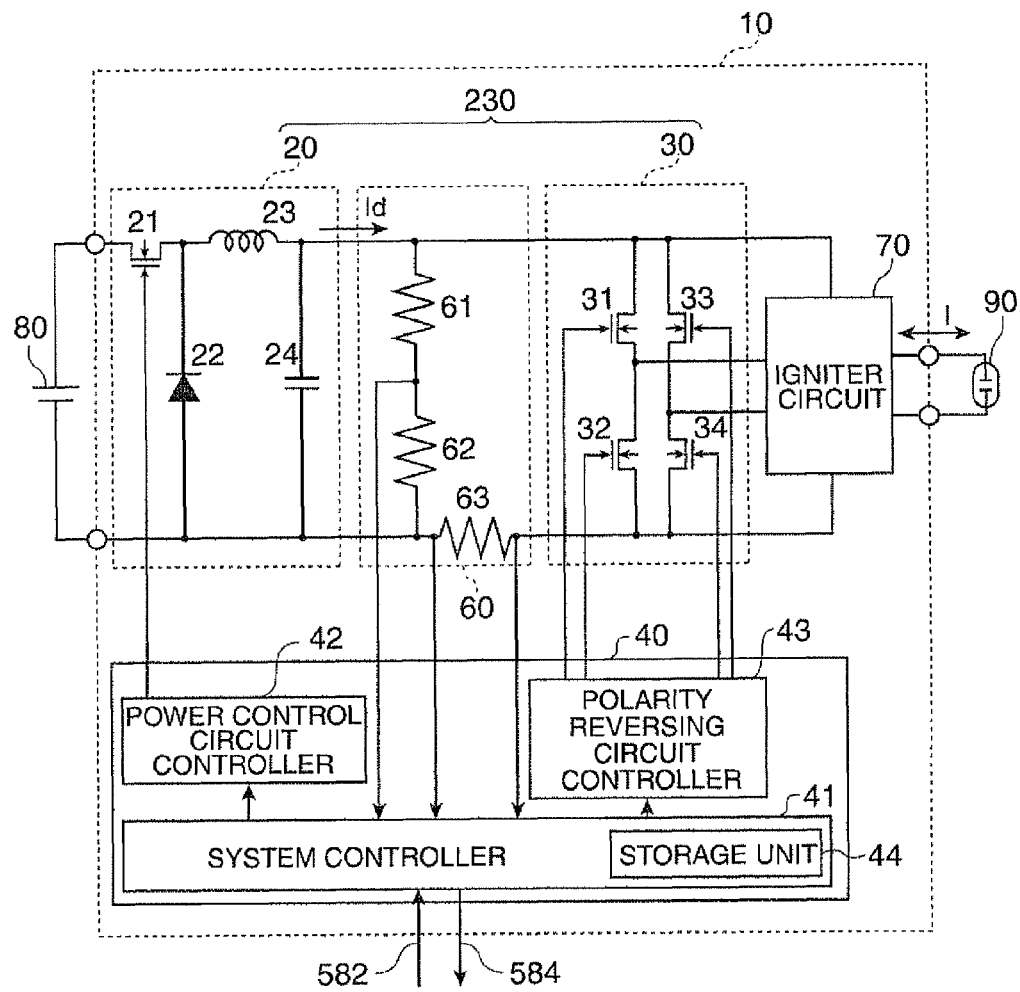
FIG. 4 is a diagram showing an example of a circuit configuration of a discharge lamp lighting device.

FIG. 4 is a diagram showing an example of a circuit configuration of the discharge lamp lighting device 10.

The discharge lamp lighting device 10 includes a power control circuit 20. The power control circuit 20 generates drive power to be supplied to the discharge lamp 90. In the first embodiment, the power control circuit 20 is composed of a down-chopper circuit receiving an input from a direct-current power supply device 80, and stepping down the input voltage to thereby output a direct current Id.

The power control circuit 20 can be configured including a switch element 21, a diode 22, a coil 23, and a capacitor 24. The switch element 21 can be formed of, for example, a transistor. In the first embodiment, one end of the switch element 21 is connected to a positive voltage side of the direct-current power supply device 80, and the other end thereof is connected to the cathode terminal of the diode 22 and one end of the coil 23. Further, one end of the capacitor 24 is connected to the other end of the coil 23, and the other end of the capacitor 24 is connected to the anode terminal of the diode 22 and a negative voltage side of the direct-current power supply 80. A current control signal is input to the control terminal of the switch element 21 from a control section 40 (described later) to thereby perform ON/OFF control of the switch element 21. As the current control signal, a pulse width modulation (PWM) control signal can be used, for example.

Here, when the switch element 21 is switched ON, a current flows through the coil 23, and energy is stored in the coil 23. Subsequently, when the switch element 21 is switched OFF, the energy stored in the coil 23 is released along the path passing through the capacitor 24 and the diode 22. As a result, the direct current Id according to a proportion of the ON time of the switch element 21 is generated.

The discharge lamp lighting device 10 includes a polarity reversing circuit 30. The polarity reversing circuit 30 inputs the direct current Id output from the power control circuit 20 and reverses the polarity thereof at a predetermined timing to thereby generate and output a drive current I, which may be a direct current lasting for a controlled period of time or an alternating current having an arbitrary frequency. In the first embodiment, the polarity reversing circuit 30 is formed of an inverter bridge circuit (a full bridge circuit).

The polarity reversing circuit 30 includes a first switch element 31, a second switch element 32, a third switch element 33, and a fourth switch element 34 each formed of, for example, a transistor, and is configured by connecting, in parallel to each other, a set of the first and second switch elements 31, 32 connected in series and a set of third and fourth switch elements 33, 34 connected in series. The control terminal of each of the first switch element 31, the second switch element 32, the third switch element 33, and the fourth switch element 34 is provided with a polarity reversing control signal input from the control section 40, and ON/OFF control of the first switch element 31, the second switch element 32, the third switch element 33, and the fourth switch element 34 is performed in accordance with the polarity reversing control signal.

The polarity reversing circuit 30 repeatedly performs ON/OFF operation alternately on a set of the first and fourth switch elements 31, 34 and a set of the second and third switch elements 32, 33 to thereby alternately reverse the polarity of the direct current Id output from the power control circuit 20, and thus generating the drive current I, which is switched between the direct current lasting for a controlled period of time and the alternating current having a controlled frequency, and then outputting the drive current I from the common node of the first and second switch elements 31, 32 and the common node of the third and fourth switch elements 33, 34.

Specifically, the control is performed so that the second and third switch elements 32, 33 are set to the OFF state while the first and fourth switch elements 31, 34 are in the ON state, and the second and third switch elements 32, 33 are set to the ON state while the first and fourth switch elements 31, 34 are in the OFF state. Therefore, while the first and fourth switch elements 31, 34 are in the ON state, there is generated the drive current I flowing from one end of the capacitor 24 through the first switch element 31, the discharge lamp 90, and the fourth switch element 34 in this order. Further, while the second and third switch elements 32, 33 are in the ON state, there is generated the drive current I flowing from one end of the capacitor 24 through the third switch element 33, the discharge lamp 90, and the second switch element 32 in this order.

In the first embodiment, the combination of the power control circuit 20 and the polarity reversing circuit 30 corresponds to a discharge lamp drive section 230. In other words, the discharge lamp drive section 230 supplies the discharge lamp 90 with the drive current I for driving the discharge lamp 90.

The discharge lamp lighting device 10 includes the control section 40. The control section 40 controls the discharge lamp drive section 230. In the example shown in FIG. 4, the control section 40 controls the power control circuit 20 and the polarity reversing circuit 30 to thereby control the holding time during which the drive current I lasts in the same polarity, the current value, the frequency, and so on of the drive current I. The control section 40 performs the polarity reversing control for controlling the holding time during which the drive current I lasts in the same polarity, and the frequency and so on of the drive current I on the polarity reversing circuit 30 based on the polarity reversing timing of the drive current I. Further, the control section 40 performs, on the power control circuit 20, the current control for controlling the current value of the direct current Id output therefrom.

Although the configuration of the control section 40 is not particularly limited, the control section 40 is configured including a system controller 41, a power control circuit controller 42, and a polarity reversing circuit controller 43 in the first embodiment. It should be noted that it is also possible to configure a part or whole of the control section 40 with a semiconductor integrated circuit.

The system controller 41 controls the power control circuit controller 42 and the polarity reversing circuit controller 43, thereby controlling the power control circuit 20 and the polarity reversing circuit 30. It is also possible for the system controller 41 to control the power control circuit controller 42 and the polarity reversing circuit controller 43 based on the drive voltage Vla and the drive current I detected by an operation detection section 60 disposed inside the discharge lamp lighting device 10 described later.

In the first embodiment, the system controller 41 is configured including a storage section 44. It should be noted that the storage section 44 can be provided independently of the system controller 41.

It is also possible for the system controller 41 to control the power control circuit 20 and the polarity reversing circuit 30 based on the information stored in the storage section 44. It is also possible for the storage section 44 to store the information related to drive parameters such as the holding time during which the drive current I lasts in the same polarity, and the current value, the frequency, the waveform, the modulation pattern of the drive current I.

The power control circuit controller 42 outputs the current control signal to the power control circuit 20 based on the control signal from the system controller 41, thereby controlling the power control circuit 20.

Figure 5:
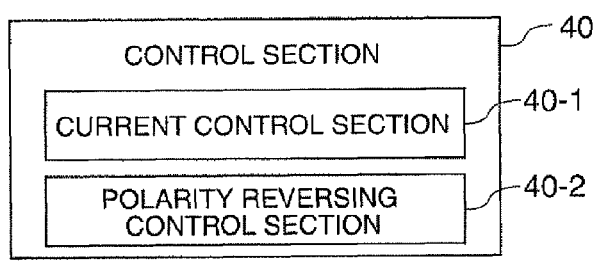
FIG. 5 is a diagram for explaining another configuration example of a control section.

The polarity reversing circuit controller 43 outputs the polarity reversing control signal to the polarity reversing circuit 30 based on the control signal from the system controller 41, thereby controlling the polarity reversing circuit 30.

it should be noted that the control section 40 can also be realized with a dedicated circuit to perform the control operation described above and various control operations of the processes described later, or can also be arranged to function as a computer with, for example, the central processing unit (CPU) performing a control program stored in the storage section 44 or the like to thereby perform the various control operations of the processes. FIG. 5 is a diagram for explaining another configuration example of the control section 40. As shown in FIG. 5, the control section 40 can also be configured so as to function as a current control section 40-1 for controlling the power control circuit 20 and a polarity reversing control section 40-2 for controlling the polarity reversing circuit 30 with the control program.

Further, although in the example shown in FIG. 4, the control section 40 is configured as a part of the discharge lamp lighting device 10, it can also be configured that the CPU 580 assumes a part of the function of the control section 40.

The discharge lamp lighting device 10 can also include the operation detection section 60. It is also possible for the operation detection section 60 to include, for example, a voltage detection section for detecting the drive voltage Vla of the discharge lamp 90 to output the drive voltage information to the control section 40, and a current detection section for detecting the drive current I to output the drive current information to the control section 40. In the first embodiment, the operation detection section 60 is configured including a first resistor 61, a second resistor 62, and a third resistor 63.

In the first embodiment, the voltage detection section detects the drive voltage Vla based on the voltage divided by the first and second resistors 61, 62 connected in series to each other and connected in parallel to the discharge lamp 90. Further, in the first embodiment, the current detection section detects the drive current I based on the voltage generated in the third resistor 63 connected in series to the discharge lamp 90.

The discharge lamp lighting device 10 can include an igniter circuit 70. The igniter circuit 70 operates only at the start of lighting of the discharge lamp 90, and supplies the high voltage (a voltage higher than the voltage applied in the normal lighting of the discharge lamp 90), which is necessary for causing the dielectric breakdown between the electrodes (between the first and second electrodes 92, 93) of the discharge lamp 90 and forming the discharge path at the start of lighting of the discharge lamp 90, between the electrodes (between the first and second electrodes 92, 93) of the discharge lamp 90. In the first embodiment, the igniter circuit 70 is connected in parallel to the discharge lamp 90.

1-4. Relationship Between Drive Current Polarity and Electrode Temperature

FIGS. 6A through 6D are explanatory diagrams showing a relationship between the polarity of the drive current I supplied to a discharge lamp 90 and the temperature of the electrodes. FIGS. 6A and 6B show the operational states of the first and second electrodes 92, 93. In the drawings, there are shown the tip portions of the first and second electrodes 92, 93. The tips of the first and second electrodes 92, 93 are respectively provided with projections 552p, 562p. The discharge occurs between the first and second electrodes 92, 93 is mainly generated between the projections 552p, 562p. In the present embodiment, migration of the discharge position (the arc position) in each of the first and second electrodes 92, 93 can be suppressed compared to the case without the projections. It should be noted that such projections can also be omitted.

FIG. 6A shows a first polarity state P1 in which the first electrode 92 acts as an anode, and the second electrode 93 acts as a cathode. In the first polarity state P1, electrons migrate from the second electrode 93 (the cathode) to the first electrode 92 (the anode) due to the discharge. The electrons are emitted from the cathode (the second electrode 93). The electrons emitted from the cathode (the second electrode 93) collide with the tip of the anode (the first electrode 92). The collision causes heat, and the temperature of the tip (the projection 552p) of the anode (the first electrode 92) rises.

FIG. 6B shows a second polarity state P2 in which the first electrode 92 acts as the cathode, and the second electrode 93 acts as the anode. In the second polarity state P2, in contrast to the first polarity state P1, electrons migrate from the first electrode 92 to the second electrode 93. As a result, the temperature of the tip (the projection 562p) of the second electrode 93 rises.

As described above, the temperature of the anode is apt to become higher than that of the cathode. Here, if the state in which the temperature of one electrode is higher than that of the other electrode continues, various problems may be caused. For example, if the tip of the high-temperature electrode is excessively melted, unintended electrode deformation is caused. As a result, the arc length may be shifted from an appropriate value. Further, if the meltage of the tip of the lower-temperature electrode is insufficient, minute unevenness caused on the tip may remain unmelted. As a result, so-called arc jump may be caused (the arc position may not be stabilized and migrate).

As a technology for preventing such problems, the alternating-current drive for repeatedly exchanging the polarities of each of the electrodes can be utilized. FIG. 6C is a timing chart showing an example of the drive current I supplied to the discharge lamp 90 (FIG. 2). The lateral axis represents time T, and the vertical axis represents the current value of the drive current I. The drive current I represents the current flowing through the discharge lamp 90. The positive value represents the first polarity state P1, and the negative value represents the second polarity state P2. In the example shown in FIG. 6C, there is used a rectangular-wave alternating current as the drive current I. Further, in the example shown in FIG. 6C, the first polarity state P1 and the second polarity state P2 are repeated alternately. Here, a first polarity period Tp represents a time period in which the first polarity state P1 lasts, and a second polarity period Tn represents a time period in which the second polarity state P2 lasts. Further, in the example shown in FIG. 6C, an average current value in the first polarity period Tp is Im1, and an average current value in the second polarity period Tn is −Im2. It should be noted that the frequency of the drive current I suitable for the drive of the discharge lamp 90 can be determined experimentally in accordance with the characteristic of the discharge lamp 90 (e.g., a value in a range of 30 Hz through 1 kHz is adopted). The other values Im1, −Im2, Tp, and Tn can also be determined experimentally.

FIG. 6D is a timing chart showing a temperature variation of the first electrode 92. The lateral axis represents time T, and the vertical axis represents temperature H. The temperature H of the first electrode 92 rises in the first polarity state P1, and the temperature H of the first electrode 92 drops in the second polarity state P2. Further, since the first polarity state P1 and the second polarity state P2 are repeated alternately, the temperature H varies periodically between the minimum value Hmin and the maximum value Hmax. It should be noted that although not shown in the drawing, the temperature of the second electrode 93 varies in opposite phase with the temperature H of the first electrode 92. In other words, the temperature of the second electrode 93 drops in the first polarity state P1, and the temperature of the second electrode 93 rises in the second polarity state P2.

In the first polarity state P1, since the tip of the first electrode 92 (the projection 552p) is melted, the tip of the first electrode 92 (the projection 552p) is smoothed. Thus, the migration of the discharge position in the first electrode 92 can be prevented. Further, since the temperature of the tip of the second electrode 93 (the projection 562p) drops, the excessive meltage of the second electrode 93 (the projection 562p) can be prevented. Thus, unintended electrode deformation can be prevented. In the second polarity state P2, the situations of the first electrode 92 and the second electrode 93 are reversed. Therefore, by repeating the two states P1, P2 alternately, the problems in each of the first and second electrodes 92, 93 can be prevented.

Here, in the case in which the waveform of the current I is symmetric, in other words, in the case in which the waveform of the current I satisfies the conditions "|Im1|=|−Im2|, and Tp=Tn," the conditions of the supplied power are the same between the first and second electrodes 92, 93. Therefore, it is presumed that if the thermal conditions (how easily the temperature rises and how easily the temperature drops) of the first and second electrodes 92, 93 are the same, the temperature difference between the first and second electrodes 92, 93 becomes small. However, if the thermal conditions are different between the first and second electrodes 92, 93, the projection of the tip portion of the electrode in the condition of more easily becoming high in temperature might disappear. The disappearance of the projection of the tip portion of the electrode causes the origin of the arc to be unstable, or further deformation of the electrode to be incurred. Further, an excessive electrode material evaporates from the tip portion of the electrode in the condition of more easily becoming high in temperature, and it becomes easy to advance the blackening and formation of acicular crystals attached to the sealing body.

Further, if the electrode is excessively heated in a large area (an arc spot (a hot spot on the surface of the electrode due to the arc discharge) grows), the shape of the electrode breaks due to the excessive meltage. In contrast, if the electrode is excessively cooled (the arc spot shrinks), the tip of the electrode cannot sufficiently be melted, and therefore the tip thereof fails to be restored to have a smooth surface, namely the tip of the electrode becomes easy to be deformed. Therefore, if the condition in which constant power is supplied to the electrode is continued, it becomes that the tip (the projections 552p, 562p) of the electrode is deformed to have an unintended shape.

1-5. Control Example of Drive Current

Then, a specific example of the control of the drive current I in the projector 500 according to the first embodiment will be explained.

Figure 7:
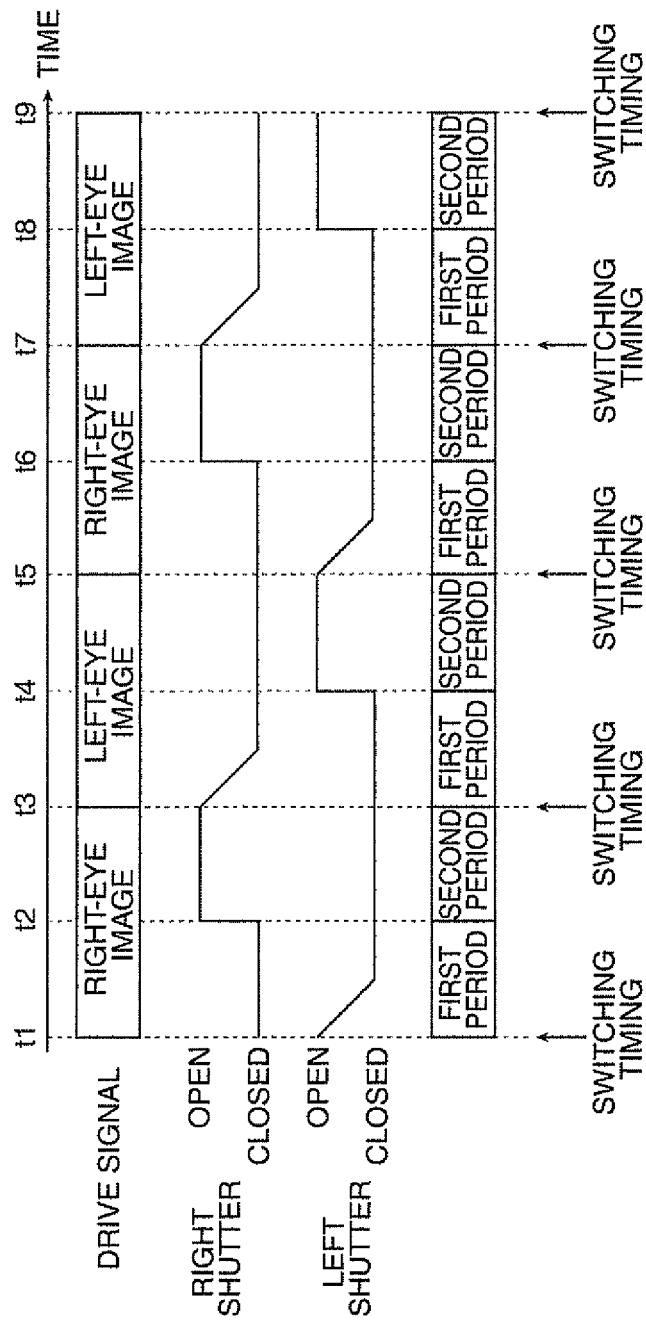
FIG. 7 is a diagram for explaining a first period, a second period, and the switching timing.

FIG. 7 is a diagram for explaining a first period, a second period, and the switching timing. FIG. 7 shows the contents of the drive signals 572R, 572G, and 572B, the open/closed state of the right shutter 412, the open/closed state of the left shutter 414, the first period or the second period, and the switching timing in this order from the top to show the temporal relationship therebetween. The lateral axis of FIG. 7 represents time.

In the example shown in FIG. 7, the drive signals 572R, 572G, and 572B are the drive signals corresponding to the right-eye image in the period from the time point t1 to the time point t3, the left-eye image in the period from the time point t3 to the time point t5, the right-eye image in the period from the time point t5 to the time point t7, and the left-eye image in the period from the time point t7 to the time point t9. Therefore, in the example shown in FIG. 7, the projector 500 switches between the right-eye image and the left-eye image and outputs them alternately using the time points t1, t3, t5, t7, and t9 as the switching timing.

The period between the switching timings temporally adjacent to each other starts with the first period and ends with the second period. In the example shown in FIG. 7, the period between the time point t1 and the time point t3 each corresponding to the switching timing, for example, starts with the first period between the time point t1 and the time point t2, and then ends with the second period between the time point t2 and the time point t3. The same can be applied to the period between the time point t3 and the time point t5 each corresponding to the switching timing, and the period between the time point t5, the time point t7 each corresponding to the switching timing and the period between the time point t7 and the time point t9 each corresponding to the switching timing. It should be noted that although it is described in the example shown in FIG. 7 that the length of the first period and the length of the second period are the same, the length of the first period and the length of the second period can arbitrarily be set individually according to needs. Further, it is also possible for a third period to intervene between the first period and the second period. In the third period, it is also possible to perform the control different from the control of the drive current I in the first and second periods described later.

The right shutter 412 becomes in the open state in at least a part of the period during which the drive signals 572R, 572G, and 572B corresponding to the right-eye image are input respectively to the liquid crystal panels 560R, 560G, and 560B. In the example shown in FIG. 7, the right shutter 412 is in the closed state in the period from the time point t1 to the time point t2, and in the open state in the period from the time point t2 to the time point t3. Further, in the example shown in FIG. 7, in the period during which the drive signals 572R, 572G, and 572B corresponding to the left-eye image are input respectively to the liquid crystal panels 560R, 560G, and 560B, the right shutter 412 starts to close at the time point t3, then finishes closing in the period between the time point t3 and the time point t4, and keeps the closed state during the period between the time point t4 and the time point t5. The change in the open/closed state of the right shutter 412 in the period between the time point t5 and the time point t9 is substantially the same as the change in the open/closed state thereof in the period between the time point t1 and the time point t5.

The left shutter 414 becomes in the open state in at least a part of the period during which the drive signals 572R, 572G, and 572B corresponding to the left-eye image are input respectively to the liquid crystal panels 560R, 560G, and 560B. In the example shown in FIG. 7, the left shutter 414 is in the closed state in the period from the time point t3 to the time point t4, and in the open state in the period from the time point t4 to the time point t5. Further, in the example shown in FIG. 7, in the period during which the drive signals 572R, 572G, and 572B corresponding to the right-eye image are input respectively to the liquid crystal panels 560R, 560G, and 560B, the left shutter 414 starts to close at the time point t1, then finishes closing in the period between the time point t1 and the time point t2, and keeps the closed state during the period between the time point t2 and the time point t3. The change in the open/closed state of the left shutter 414 in the period between the time point t5 and the time point t9 is substantially the same as the change in the open/closed state thereof in the period between the time point t1 and the time point t5.

In the example shown in FIG. 7, in the period during which the drive signals 572R, 572G, and 572B corresponding to the right-eye image are input respectively to the liquid crystal panels 560R, 560G, and 560B, the period during which the right shutter 412 is closed corresponds to the first period, and the period during which the right shutter 412 is open corresponds to the second period. Further, in the example shown in FIG. 7, in the period during which the drive signals 572R, 572G, and 572B corresponding to the left-eye image are input respectively to the liquid crystal panels 560R, 560G, and 560B, the period during which the left shutter 414 is closed corresponds to the first period, and the period during which the left shutter 414 is open corresponds to the second period. Further, in the example shown in FIG. 7, the period in which both of the right shutter 412 and the left shutter 414 are closed exists in the first period.

Figure 8:
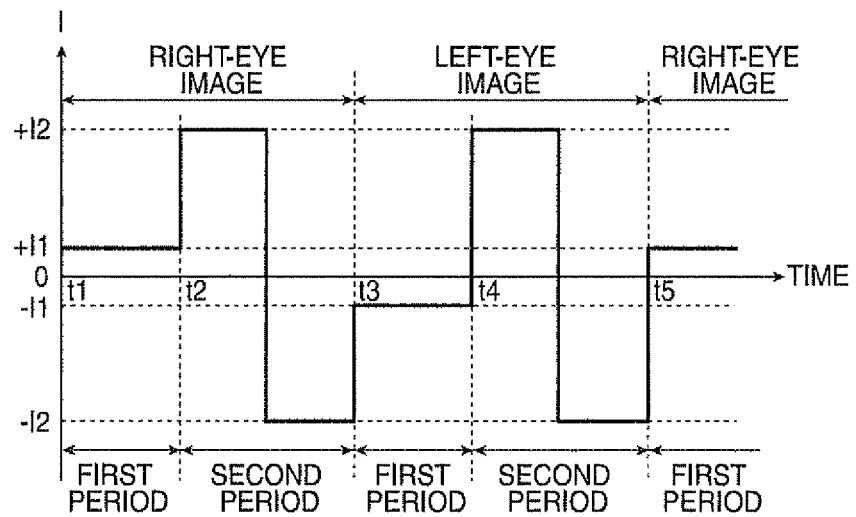
FIG. 8 is a timing chart showing a waveform example of the drive current in the first embodiment.

FIG. 8 is a timing chart showing a waveform example of the drive current I in the first embodiment. The lateral axis represents time, and the vertical axis represents the current value of the drive current I. Further, in FIG. 8, the drive current I flowing when the second electrode 93 acts as the anode is shown as a positive value, and the drive current I flowing when the first electrode 92 acts as the anode is shown as a negative value. Further, in the following explanation, the polarity of the drive current I flowing when the second electrode 93 acts as the anode is expressed as a positive polarity, and the polarity of the drive current I flowing when the first electrode 92 acts as the anode is expressed as a negative polarity.

In the projector 500 according to the first embodiment, the control section 40 controls the discharge lamp drive section 230 so that the absolute value of the drive current I becomes relatively smaller in the first period compared to the second period, and becomes relatively larger in the second period compared to the first period.

In the example shown in FIG. 8, the absolute value of the current value of the drive current I is set to I1 in the first period from the time point t1 to the time point t2, I2 in the second period from the time point t2 to the time point t3, I1 in the first period from the time point t3 to the time point t4, I2 in the second period from the time point t4 to the time point t5, and I1 in the first period after the time point t5. Further, in the example shown in FIG. 8, I1<I2 is satisfied. Therefore, the absolute value of the drive current I becomes relatively small in the first period, and becomes relatively large in the second period.

It should be noted that although in the example shown in FIG. 8 the absolute value of the drive current I in the first period and the absolute value of the drive current I in the second period are constant in the respective periods, the present embodiment is not limited to this configuration. For example, in the case in which the absolute value of the drive current I in the first period and the absolute value of the drive current I in the second period vary in the respective periods, it is also possible for the control section 40 to control the discharge lamp drive section 230 so that the average value of the absolute value of the drive current I in each of the periods becomes relatively small in the first period, and relatively large in the second period. Further, for example, in the case in which the absolute value of the drive current I in the first period and the absolute value of the drive current I in the second period vary in the respective periods, it is also possible for the control section 40 to control the discharge lamp drive section 230 so that the absolute value of the drive current I takes the minimum value in the first period, and takes the maximum value in the second period.

Further, in the projector 500 according to the first embodiment, the control section 40 performs a second period alternating-current control process for controlling the discharge lamp drive section 230 to supply the discharge lamp 90 with an alternating current as the drive current I in the second period.

In the example shown in FIG. 8, in the second period from the time point t2 to the time point t3 and the second period from the time point t4 to the time point t5, the control section 40 performs the second period alternating-current control process for controlling the discharge lamp drive section 230 to supply the discharge lamp 90 with an alternating current as the drive current I. In the example shown in FIG. 8, in the second period alternating-current control process, the control section 40 controls the discharge lamp drive section 230 to reverse the polarity of the drive current I while keeping the absolute value of the current value thereof constant in the second period to thereby generate the alternating current corresponding to one cycle, and then supply it to the discharge lamp 90 as the drive current I. The frequency of the drive current I in the second period alternating-current control process can be determined experimentally in accordance with the characteristics of the discharge lamp 90. For example, it is also possible to select the frequency of the drive current I in a range of 30 Hz through 1 kHz.

According to the projector 500 related to the first embodiment, since the control section 40 controls the discharge lamp drive section 230 so that the absolute value of the drive current I becomes the smallest in the first period, and becomes the largest in the second period, by performing the driving while keeping the average drive power throughout the first and second periods constant, it is possible to project the image with luminance, which is lower than in the case of performing the driving with the average drive power, in the first period, and to project the image with luminance, which is higher than in the case of performing the driving with the average drive power, in the second period. Since in the first period there exists the period in which both of the right shutter 412 and the left shutter 414 are closed, the image quality is hardly affected even if the image projected is dark. In contrast, in the second period, since either one of the right shutter 412 and the left shutter 414 is in the open state, it is possible to make the image projected seem brighter to the user than in the case of performing the driving with the average drive power. Therefore, the projector capable of projecting the stereoscopic image so as to seem brighter can be realized. Further, by projecting the image with lower luminance in the first period, the cross talk can be prevented from occurring. Further, since the necessity of increasing the average drive power for making the image seem brighter can be lowered, power consumption of the projector can be reduced. Thus, the deterioration of the peripheral components due to the increase in the average drive power can be prevented.

Further, according to the projector 500 related to the first embodiment, since the control section 40 performs the second period alternating-current control process for controlling the discharge lamp drive section 230 to supply the discharge lamp 90 with an alternating current as the drive current I in the second period, the consumption of the electrodes of the discharge lamp can be prevented.

Further, in the projector 500 according to the first embodiment, it is also possible for the control section 40 to perform a first period direct-current control process for controlling the discharge lamp drive section 230 to supply the discharge lamp 90 with a direct current as the drive current I in the first period, and to control the discharge lamp drive section 230 to supply direct currents having polarities reverse to each other as the drive current I in the respective two first periods temporally disposed on both sides of one second period in the first period direct-current control process.

In the example shown in FIG. 8, the drive current I is set to a direct current with the positive polarity in the first period from the time point t1 to the time point t2, a direct current with the negative polarity in the first period from the time point t3 to the time point t4, and a direct current with the positive polarity in the first period after the time point t5. In other words, the control section 40 controls the discharge lamp drive section 230 to supply the discharge lamp 90 with the direct current having the polarity reversed between the two first periods (e.g., the first period from the time point t1 to the time point t2 and the first period from the time point t3 to the time point t4) temporally disposed on both sides of one second period (e.g., the second period from the time point t2 to the time point t3) as the drive current I.

According to such control, the thermal load balance between the first electrode 92 and the second electrode 93 of the discharge lamp 90 can be maintained. Therefore, the electrodes of the discharge lamp can be prevented from being consumed in an imbalanced manner.

Further, as is explained with reference to FIG. 2, in the case in which the projector 500 includes the main reflecting mirror 112 disposed on the first electrode 92 side of the discharge lamp 90 and for reflecting the light beam generated by the discharge lamp 90 to emit it to the illuminated area, and the sub-reflecting mirror 50 disposed on the second electrode 93 side of the discharge lamp 90 so as to face the main reflecting mirror 112 and for reflecting the light beam, which is generated by the discharge lamp 90, toward the main reflecting mirror 112, it is also possible for the control section 40 to control the discharge lamp drive section 230 to supply the discharge lamp 90 with the alternating current starting with the phase in which the second electrode 93 acts as the anode as the drive current I in the second period alternating-current control process.

In the example shown in FIG. 8, in the second period from the time point t2 to the time point t3 and the second period from the time point t4 to the time point t5, the control section 40 controls the discharge lamp drive section 230 to supply the discharge lamp 90 with an alternating current (i.e., the alternating current starting with the phase in which the second electrode 93 acts as the anode) starting with the positive polarity as the drive current I.

In the case in which the main reflecting mirror 112 disposed on the first electrode 92 side of the discharge lamp 90 and for reflecting the light beam generated by the discharge lamp 90 to emit it to the illuminated area, and the sub-reflecting mirror 50 disposed on the second electrode 93 side of the discharge lamp 90 so as to face the main reflecting mirror 112 and for reflecting the light beam, which is generated by the discharge lamp 90, toward the main reflecting mirror 112 are included, there is provided a thermal condition in which the temperature of the second electrode 93 rises more easily compared to that of the first electrode 92 due to the influence of, for example, the light (returned light) reflected by the sub-reflecting mirror 50. Therefore, the second electrode 93 is easily deformed compared to the first electrode 92.

In general, the shape of the electrode becomes more stable by supplying the drive current I for reversing the polarity after raising the electrode temperature from the state in which the electrode temperature is low by increasing the current value. For example, the shape of the electrode becomes more stable by supplying the discharge lamp 90 with the drive current I for reversing the polarity after increasing the current value in the latter part of the period with the same polarity rather than supplying the discharge lamp 90 with the drive current I for reversing the polarity after decreasing the current value in the latter part of the period with the same polarity. Therefore, in the example shown in FIG. 8, the first period from the time point t1 to the time point t2 and the former half of the second period from the time point t2 to the time point t3 are combined to each other to form the period with the same polarity, and the drive current I for reversing the polarity is supplied after increasing the current value in the latter half of the period with the same polarity on the side of the second electrode 93, which is deformed more easily than the first electrode 92. Thus, it is possible to prevent the deformation of the second electrode 93, which is more easily deformed than the first electrode 92, to thereby stabilize the distance between the electrodes of the discharge lamp 90.

1-6. First Modified Example

Figure 9:
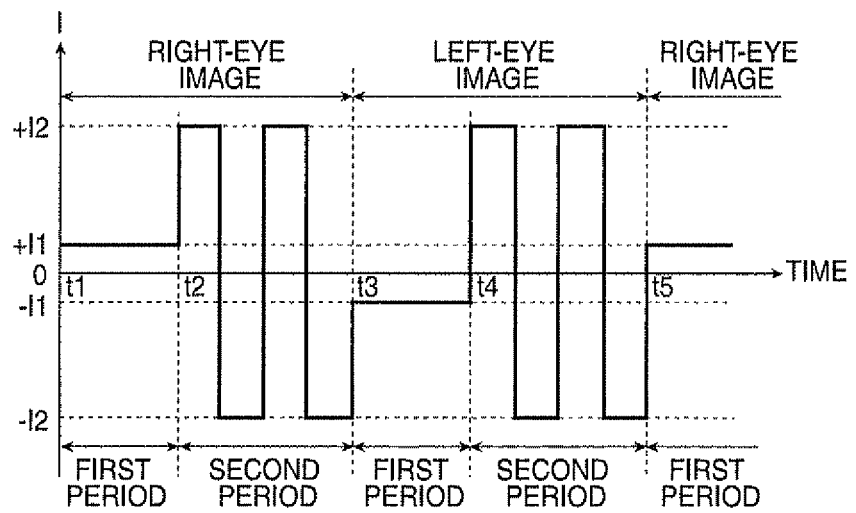
FIG. 9 is a timing chart showing a waveform example of the drive current in a first modified example of the first embodiment.

FIG. 9 is a timing chart showing a waveform example of the drive current I in a first modified example of the first embodiment. The lateral axis represents time, and the vertical axis represents the current value of the drive current I. Further, in FIG. 9, the drive current I flowing when the second electrode 93 acts as the anode is shown as a positive value, and the drive current I flowing when the first electrode 92 acts as the anode is shown as a negative value.

In the example shown in FIG. 9, in the second period alternating-current control process, the control section 40 controls the discharge lamp drive section 230 to reverse the polarity of the drive current I while keeping the absolute value of the current value thereof constant in the second period to thereby generate the alternating current corresponding to two cycles, and then supply it to the discharge lamp 90 as the drive current I. It should be noted that in order for maintaining the thermal load balance between the first electrode 92 and the second electrode 93 in the second period, it is preferable for the control section 40 to control the discharge lamp drive section 230 to supply the discharge lamp 90 with the alternating current corresponding to the integral multiple of the one cycle as the drive current I.

As described above, the frequency and the wavelength of the drive current I in the second period alternating-current control process can arbitrarily set according to needs.

1-7. Second Modified Example

Figure 10:
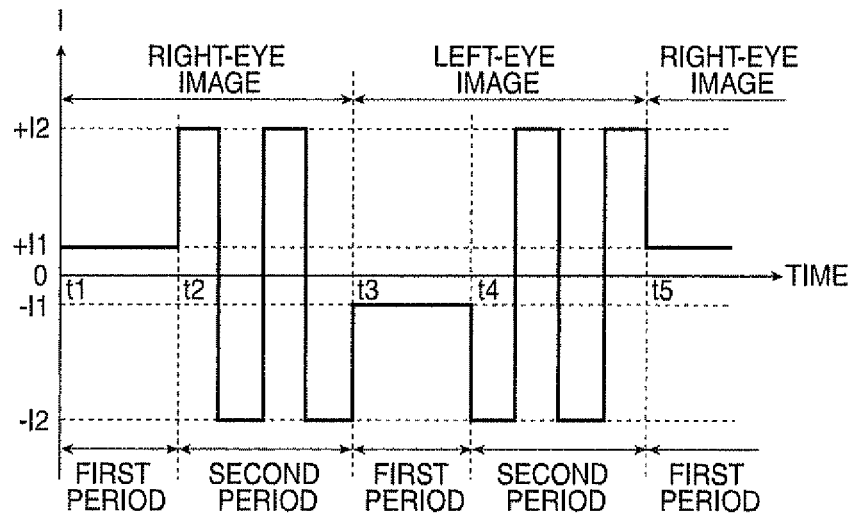
FIG. 10 is a timing chart showing a waveform example of the drive current in a second modified example of the first embodiment.

FIG. 10 is a timing chart showing a waveform example of the drive current I in a second modified example of the first embodiment. The lateral axis represents time, and the vertical axis represents the current value of the drive current I. Further, in FIG. 10, the drive current I flowing when the second electrode 93 acts as the anode is shown as a positive value, and the drive current I flowing when the first electrode 92 acts as the anode is shown as a negative value.

It is also possible for the control section 40 to perform the second period alternating-current control process for controlling the discharge lamp drive section 230 to supply the discharge lamp 90 with the alternating current with the phase reversed between the two second periods temporally disposed on both sides of one first period as the drive current I.

In the example shown in FIG. 10, in the second period from the time point t2 to the time point t3, the control section 40 controls the discharge lamp drive section 230 to supply the discharge lamp 90 with an alternating current (i.e., the alternating current starting with the phase in which the second electrode 93 acts as the anode) starting with the positive polarity as the drive current I. In contrast, in the second period from the time point t4 to the time point t5, the control section 40 controls the discharge lamp drive section 230 to supply the discharge lamp 90 with an alternating current (i.e., the alternating current starting with the phase in which the first electrode 92 acts as the anode) starting with the negative polarity as the drive current I.

According to such control, the thermal load balance between the first electrode 92 and the second electrode 93 of the discharge lamp 90 can be maintained. Therefore, the electrodes of the discharge lamp can be prevented from being consumed in an imbalanced manner. This is particularly effective in the case in which the thermal influence of the sub-reflecting mirror 50 is small, or in the case in which the discharge lamp designed to have the thermal conditions of the first electrode 92 and the second electrode 93 symmetrical to each other is used as the discharge lamp 90.

2. Projector According to Second Embodiment

Then, a projector 500 according to a second embodiment will be explained. The configurations of the optical system, the circuit, and so on of the projector 500 according to the second embodiment are substantially the same as those of the projector 500 according to the first embodiment. Therefore, a specific example of the control of the drive current I in the projector 500 according to the second embodiment will hereinafter be explained. It should be noted that the temporal relationship between the contents of the drive signals 572R, 572G, and 572B, the open/closed state of the right shutter 412, the open/closed state of the left shutter 414, the first period or the second period, and the switching timing is as already explained with reference to FIG. 7.

2-1. Control Example of Drive Current

Figure 11:
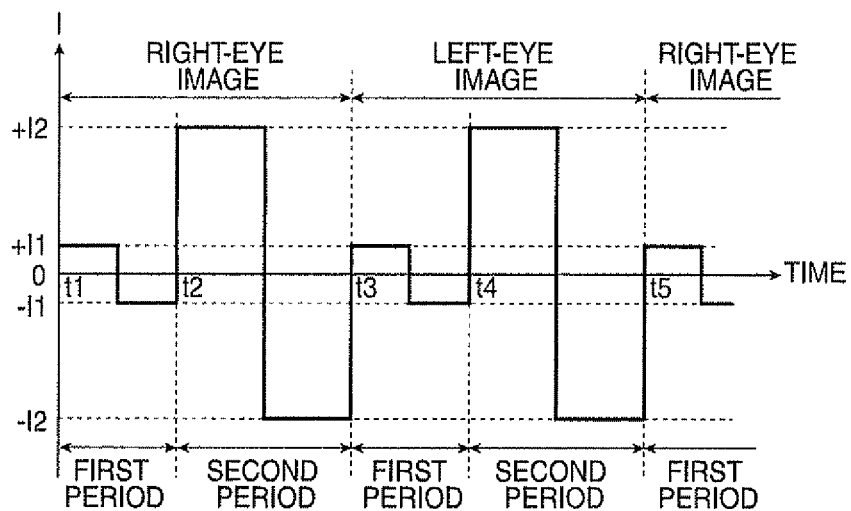
FIG. 11 is a timing chart showing a waveform example of the drive current in a second embodiment.

FIG. 11 is a timing chart showing a waveform example of the drive current I in the second embodiment. The lateral axis represents time, and the vertical axis represents the current value of the drive current I. Further, in FIG. 11, the drive current I flowing when the second electrode 93 acts as the anode is shown as a positive value, and the drive current I flowing when the first electrode 92 acts as the anode is shown as a negative value.

In the projector 500 according to the second embodiment, the control section 40 performs a second period alternating-current control process for controlling the discharge lamp drive section 230 so that the absolute value of the drive current I becomes relatively smaller in the first period compared to the second period, and becomes relatively larger in the second period compared to the first period, and further, the alternating current is supplied to the discharge lamp 90 as the drive current I in the second period. The details and various modifications of the absolute value of the drive current I, the details and various modifications of the second period alternating-current control process, and the advantages thereof are substantially the same as those of the projector 500 according to the first embodiment.

In the projector 500 according to the second embodiment, it is also possible for the control section 40 to perform a first period alternating-current control process for controlling the discharge lamp drive section 230 to supply the discharge lamp 90 with an alternating current as the drive current I in the first period. The frequency of the drive current I in the first period alternating-current control process can be determined experimentally in accordance with the characteristics of the discharge lamp 90. For example, it is also possible to select the frequency of the drive current I in a range of 30 Hz through 1 kHz.

In the example shown in FIG. 11, the drive current I is set to an alternating current in both of the first and second periods. Further, in the example shown in FIG. 11, the absolute value of the current value of the drive current I is set to I1 in the first period from the time point t1 to the time point t2, I2 in the second period from the time point t2 to the time point t3, I1 in the first period from the time point t3 to the time point t4, I2 in the second period from the time point t4 to the time point t5, and I1 in the first period after the time point t5. Further, in the example shown in FIG. 11, I1<I2 is satisfied. Therefore, the absolute value of the drive current I becomes relatively small in the first period, and becomes relatively large in the second period.

In general, if the electrode temperature is low, the flicker occurs easily. In order for preventing the flicker from occurring, it is more preferable to drive the discharge lamp 90 with an alternating current rather than to drive it with a direct current. Therefore, by supplying the discharge lamp 90 with the alternating current as the drive current I in both of the first and second periods, the flicker can be prevented from occurring in the first period in which the electrode temperature of the discharge lamp is lowered. Further, the prevention of the flicker from occurring also leads to stabilization of the position of the discharge point. Therefore, it is possible to prevent the deformation of the projection in the case in which the electrode temperature becomes relatively low.

Further, in the projector 500 according to the second embodiment, it is also possible for the control section 40 to control the discharge lamp drive section 230 to supply the discharge lamp 90 with an alternating current with a frequency higher than in the second period alternating-current control process as the drive current I in the first period alternating-current control process.

In the example shown in FIG. 11, the drive current I in the first period is the alternating current with the frequency higher than that of the drive current I in the second period.

In general, if the electrode temperature is low, the discharge point of the electrode becomes more stable by driving it with a high-frequency alternating current. Therefore, by supplying the discharge lamp 90 with the alternating current having a frequency higher than in the second period alternating-current control process as the drive current I in the first period alternating-current control process, the flicker can further be prevented from occurring in the first period in which the electrode temperature of the discharge lamp is lowered. Further, the prevention of the flicker from occurring also leads to stabilization of the position of the discharge point. Therefore, it is possible to prevent the deformation of the projection in the case in which the electrode temperature becomes relatively low.

Further, as is explained with reference to FIG. 2, in the case in which the projector 500 includes the main reflecting mirror 112 disposed on the first electrode 92 side of the discharge lamp 90 and for reflecting the light beam generated by the discharge lamp 90 to emit it to the illuminated area, and the sub-reflecting mirror 50 disposed on the second electrode 93 side of the discharge lamp 90 so as to face the main reflecting mirror 112 and for reflecting the light beam, which is generated by the discharge lamp 90, toward the main reflecting mirror 112, it is also possible for the control section 40 to control the discharge lamp drive section 230 to supply the discharge lamp 90 with the alternating current starting with the phase in which the second electrode 93 acts as the anode as the drive current I in at least one of the first period alternating-current control process and the second period alternating-current control process.

In the example shown in FIG. 11, in the first period from the time point t1 to the time point t2, the first period from the time point t3 to the time point t4, and the first period after the time point t5, the control section 40 controls the discharge lamp drive section 230 to supply the discharge lamp 90 with an alternating current (i.e., the alternating current starting with the phase in which the second electrode 93 acts as the anode) starting with the positive polarity as the drive current I.

Further, in the example shown in FIG. 11, in the second period from the time point t2 to the time point t3 and the second period from the time point t4 to the time point t5, the control section 40 controls the discharge lamp drive section 230 to supply the discharge lamp 90 with an alternating current starting with the positive polarity (i.e., the alternating current starting with the phase in which the second electrode 93 acts as the anode) as the drive current I.

In the case in which the main reflecting mirror 112 disposed on the first electrode 92 side of the discharge lamp 90 and for reflecting the light beam generated by the discharge lamp 90 to emit it to the illuminated area, and the sub-reflecting mirror 50 disposed on the second electrode 93 side of the discharge lamp 90 so as to face the main reflecting mirror 112 and for reflecting the light beam, which is generated by the discharge lamp 90, toward the main reflecting mirror 112 are included, there is provided a thermal condition in which the temperature of the second electrode 93 rises more easily compared to that of the first electrode 92 due to the influence of, for example, the light (returned light) reflected by the sub-reflecting mirror 50. Therefore, the second electrode 93 is easily deformed compared to the first electrode 92.

In general, the shape of the electrode becomes more stable by supplying the drive current I for reversing the polarity after raising the electrode temperature from the state in which the electrode temperature is low by increasing the current value. Therefore, in the example shown in FIG. 11, the alternating current starting with the positive polarity in which the second electrode 93 acts as the anode is supplied to the discharge lamp 90 as the drive current I after the first period from the time point t1 to the time point t2 in which the electrode temperature is lowered. On the side of the second electrode 93, which can be deformed more easily than the first electrode 92, the drive current I for reversing the polarity is supplied after the current value is increased in the state in which the electrode temperature is low to raise the electrode temperature. Thus, it is possible to prevent the deformation of the second electrode 93, which is more easily deformed than the first electrode 92, to thereby stabilize the distance between the electrodes of the discharge lamp 90.

2-2. Modified Example

Figure 12:
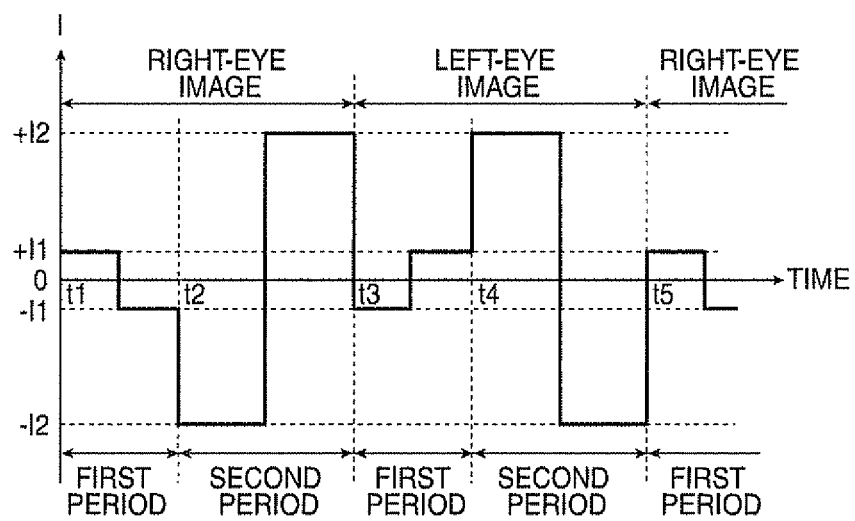
FIG. 12 is a timing chart showing a waveform example of the drive current in a modified example of the second embodiment.

FIG. 12 is a timing chart showing a waveform example of the drive current I in a modified example of the second embodiment. The lateral axis represents time, and the vertical axis represents the current value of the drive current I. Further, in FIG. 12, the drive current I flowing when the second electrode 93 acts as the anode is shown as a positive value, and the drive current I flowing when the first electrode 92 acts as the anode is shown as a negative value.

It is also possible for the control section 40 to perform the second period alternating-current control process for controlling the discharge lamp drive section 230 to supply the discharge lamp 90 with the alternating current with the phase reversed between the two second periods temporally disposed on both sides of one first period as the drive current I.

In the example shown in FIG. 12, in the second period from the time point t2 to the time point t3, the control section 40 controls the discharge lamp drive section 230 to supply the discharge lamp 90 with an alternating current (i.e., the alternating current starting with the phase in which the first electrode 92 acts as the anode) starting with the negative polarity as the drive current I. In contrast, in the second period from the time point t4 to the time point t5, the control section 40 controls the discharge lamp drive section 230 to supply the discharge lamp 90 with an alternating current (i.e., the alternating current starting with the phase in which the second electrode 93 acts as the anode) starting with the positive polarity as the drive current I.

According to such control, the thermal load balance between the first electrode 92 and the second electrode 93 of the discharge lamp 90 can be maintained. Therefore, the electrodes of the discharge lamp can be prevented from being consumed in an imbalanced manner. This is particularly effective in the case in which the thermal influence of the sub-reflecting mirror 50 is small, or in the case in which the discharge lamp designed to have the thermal conditions of the first electrode 92 and the second electrode 93 symmetrical to each other is used as the discharge lamp 90.

Further, it is also possible for the control section 40 to perform the first period alternating-current control process for controlling the discharge lamp drive section 230 to supply the discharge lamp 90 with the alternating current with the phase reversed between the two first periods temporally disposed on both sides of one second period as the drive current I.

In the example shown in FIG. 12, in the first period from the time point t1 to the time point t2, and the first period after the time point t5, the control section 40 controls the discharge lamp drive section 230 to supply the discharge lamp 90 with an alternating current (i.e., the alternating current starting with the phase in which the second electrode 93 acts as the anode) starting with the positive polarity as the drive current I. In contrast, in the first period from the time point t3 to the time point t4, the control section 40 controls the discharge lamp drive section 230 to supply the discharge lamp 90 with an alternating current (i.e., the alternating current starting with the phase in which the first electrode 92 acts as the anode) starting with the negative polarity as the drive current I.

According to such control, the thermal load balance between the first electrode 92 and the second electrode 93 of the discharge lamp 90 can be maintained. Therefore, the electrodes of the discharge lamp can be prevented from being consumed in an imbalanced manner. This is particularly effective in the case in which the thermal influence of the sub-reflecting mirror 50 is small, or in the case in which the discharge lamp designed to have the thermal conditions of the first electrode 92 and the second electrode 93 symmetrical to each other is used as the discharge lamp 90.

Further, it is also possible to control the discharge lamp drive section 230 to supply the discharge lamp 90 with the alternating current starting with the phase reversed between the first and second periods between the switching timings temporally adjacent to each other as the drive current I.

In the example shown in FIG. 12, in the first period from the time point t1 to the time point t2, the control section 40 controls the discharge lamp drive section 230 to supply the discharge lamp 90 with an alternating current starting with the positive polarity as the drive current I. In contrast, in the second period from the time point t2 to the time point t3, the control section 40 controls the discharge lamp drive section 230 to supply the discharge lamp 90 with an alternating current starting with the negative polarity as the drive current I.

Further, in the example shown in FIG. 12, in the first period from the time point t3 to the time point t4, the control section 40 controls the discharge lamp drive section 230 to supply the discharge lamp 90 with an alternating current starting with the negative polarity as the drive current I. In contrast, in the second period from the time point t4 to the time point t5, the control section 40 controls the discharge lamp drive section 230 to supply the discharge lamp 90 with an alternating current starting with the positive polarity as the drive current I.

In general, the shape of the electrode becomes more stable by supplying the drive current I for reversing the polarity after raising the electrode temperature from the state in which the electrode temperature is low by increasing the current value. For example, the shape of the electrode becomes more stable by supplying the discharge lamp 90 with the drive current I for reversing the polarity after increasing the current value in the latter part of the period with the same polarity rather than supplying the discharge lamp 90 with the drive current I for reversing the polarity after decreasing the current value in the latter part of the period with the same polarity.

Therefore, in the example shown in FIG. 12, the latter half of the first period from the time point t1 to the time point t2 and the second period from the time point t2 to the time point t3 are combined to each other to form the period with the same polarity, and the drive current I for reversing the polarity is supplied after increasing the current value in the latter half of the period with the same polarity on the side of the first electrode 92. Further, the latter half of the first period from the time point t3 to the time point t4 and the second period from the time point t4 to the time point t5 are combined to each other to form the period with the same polarity, and the drive current I for reversing the polarity is supplied after increasing the current value in the latter half of the period with the same polarity on the side of the second electrode 93. Thus, it is possible to prevent the deformation of the first electrode 92 and the second electrode 93 to thereby stabilize the distance between the electrodes of the discharge lamp 90.

Although in each of the embodiments described above the explanations are presented exemplifying the projector using the three liquid crystal panels, the invention is not limited thereto, but can be applied to the projector using one, two, four, or more liquid crystal panels.

Although in each of the embodiments described above the explanation is presented exemplifying the transmissive projector, the invention not limited thereto, but can also be applied to a reflective projector. It should be noted here that "transmissive" denotes that the electro-optic modulation device as the light modulation section is a type of transmitting a light beam such as a transmissive liquid crystal panel, and "reflective" denotes that the electro-optic modulation device as the light modulation section is a type of reflecting a light beam such as a reflective liquid crystal panel or a micromirror light modulation device. As the micromirror light modulation device, for example, a digital micromirror device (DMD, a trademark of Texas Instruments) can be used. Also in the case in which the invention is applied to the reflective projector, the same advantages as in the case with the transmissive projector can be obtained.

The invention can be applied to a front projection projector for performing projection from the side of observing the projection image, and also to a rear projection projector for performing projection from the side opposite to the side of observing the projection image.

It should be noted that the invention is not limited to the embodiments described above, but can be put into practice with various modification within the scope or the spirit of the invention.

The invention includes configurations (e.g., configurations having the same function, the same way, and the same result, or configurations having the same object and the same advantages) substantially the same as those described in the embodiment section. Further, the invention includes configurations obtained by replacing a non-essential part of the configurations described in the embodiment section. Further, the invention includes configurations exerting the same advantage or configurations capable of achieving the same object as the configurations described in the embodiment section. Further, the invention includes configurations obtained by adding technologies known to the public to the configurations described in the embodiment section.

What is claimed is:

1. A projector configured to switch between a right-eye image and a left-eye image at a first switching timing and a second switching timing of a plurality of switching timings to output the right-eye image and the left-eye image alternately, the first switching timing and the second switching timing of the plurality of switching timings being temporally adjacent to each other, the projector comprising:
   a discharge lamp;
   a discharge lamp drive section configured to supply a drive current to the discharge lamp for driving the discharge lamp; and
   a control section configured to control the discharge lamp drive section,
      a time between the first switching timing and the second switching timing of a plurality of switching timings including a first period and a second period, and
      the control section being configured to perform a second period alternating-current control process that controls the discharge lamp drive section such that
         an absolute value of the drive current in the first period is less than the drive current in the second period, and
         the drive current supplied to the discharge lamp during the second period is an alternating current.

2. The projector according to claim 1,
   the control section being configured to perform a first period direct-current control process that controls the discharge lamp drive section to supply a direct current as the drive current to the discharge lamp during the first period, and in the first period direct-current control process, the control section controlling the discharge lamp drive section to supply the discharge lamp with the direct current as the drive current during the first period following the first switching timing and during a first period following the second switching timing, the direct current supplied during the first period following the first switching timing having an opposite polarity than that of the direct current supplied during the first period following the second switching timing.

3. The projector according to claim 1, the control section being configured to perform a first period alternating-current control process that controls the discharge lamp drive section to supply an alternating current as the drive current to the discharge lamp during the first period.

4. The projector according to claim 3, in the first period alternating-current control process, the control section controlling the discharge lamp drive section to supply the discharge lamp with an alternating current having a frequency higher than in the second period alternating-current control process.

5. The projector according to claim 3, the control section being configured to perform a first period alternating-current control process for controlling the discharge lamp drive section to supply the discharge lamp with an alternating current as the drive current during the first period following the first switching timing and during a first period following the second switching timing, the alternating-current supplied during the first period following the first switching timing having an opposite phase than that of the alternating-current supplied during the first period following the second switching timing.

6. The projector according to claim 1, wherein the control section being configured to perform the second period alternating-current control process for controlling the discharge lamp drive section to supply the discharge lamp with an alternating current as the drive current during the second period following the first switching timing and during a second period following the second switching timing, the alternating-current supplied during the second period following the first switching timing having an opposite phase than that of the alternating-current supplied during the second period following the second switching timing.

7. The projector according to claim 1, the discharge lamp further including a first electrode side and a second electrode side, the projector further comprising:
a main reflecting mirror disposed on the first electrode side of the discharge lamp, the main reflecting mirror being configured to reflect a light beam generated by the discharge lamp to thereby emit the light beam to an illuminated area; and
a sub-reflecting mirror disposed on the second electrode side so as to face the main reflecting mirror of the discharge lamp, the sub-reflecting mirror configured to reflect the light beam generated by the discharge lamp toward the main reflecting mirror,
the control section being configured to control the discharge lamp drive section to supply the discharge lamp with an alternating current starting with a phase in which the second electrode acts as an anode as the drive current in at least one of the first period alternating-current control process and the second period alternating-current control process.

8. A method for controlling a discharge lamp drive section of a projector to switch between a right-eye image and a left-eye image at a first switching timing and a second switching timing of a plurality of switching timings, the first switching timing and the second switching timing of the plurality of plurality of switching timings being temporally adjacent to each other and a time between the first switching timing and the second switching timing of a plurality of switching timings includes a first period and a second period, the method comprising:
supplying a drive current to the discharge lamp driving section for driving a discharge lamp; and
performing a second period alternating-current control process that controls the discharge lamp drive section to supply the drive current having an absolute value that is less in the first period than the drive current in the second period, the drive current supplied to the discharge lamp during the second period being an alternating current.

9. The method according to claim 8, further comprising:
a first period direct-current control process that controls the discharge lamp drive section to supply a direct current as the drive current to the discharge lamp during the first period following the first switching timing and during a first period following the second switching timing, the direct current supplied during the first period following the first switching timing having an opposite polarity than that of the direct current supplied during the first period following the second switching timing.

10. The method according to claim 8, further comprising:
performing a first period alternating-current control process that controls the discharge lamp drive section to supply an alternating current as the drive current during the first period to the discharge lamp.

11. The method according to claim 10, the first period alternating-current control process including supplying the discharge lamp with an alternating current having a frequency higher than in the second period alternating-current control process.

12. The method according to claim 10, the first period alternating-current control process including supplying the discharge lamp with an alternating current as the drive current during the first period following the first switching timing and during a first period following the second switching timing, and
the alternating-current supplied during the first period following the first switching timing having an opposite phase than that of the alternating-current supplied during the first period following the second switching timing.

13. The method according to claim 8, the second period alternating-current control process including supplying the discharge lamp with an alternating current as the drive current during the second period following the first switching timing and during a second period following the second switching timing, and
the alternating-current supplied during the second period following the first switching timing having an opposite phase than that of the alternating-current supplied during the second period following the second switching timing.

* * * * *